Jan. 6, 1925. 1,521,638
I. E. McCABE
PRESSURE GAUGE TUBE
Filed May 25, 1923  2 Sheets-Sheet 1
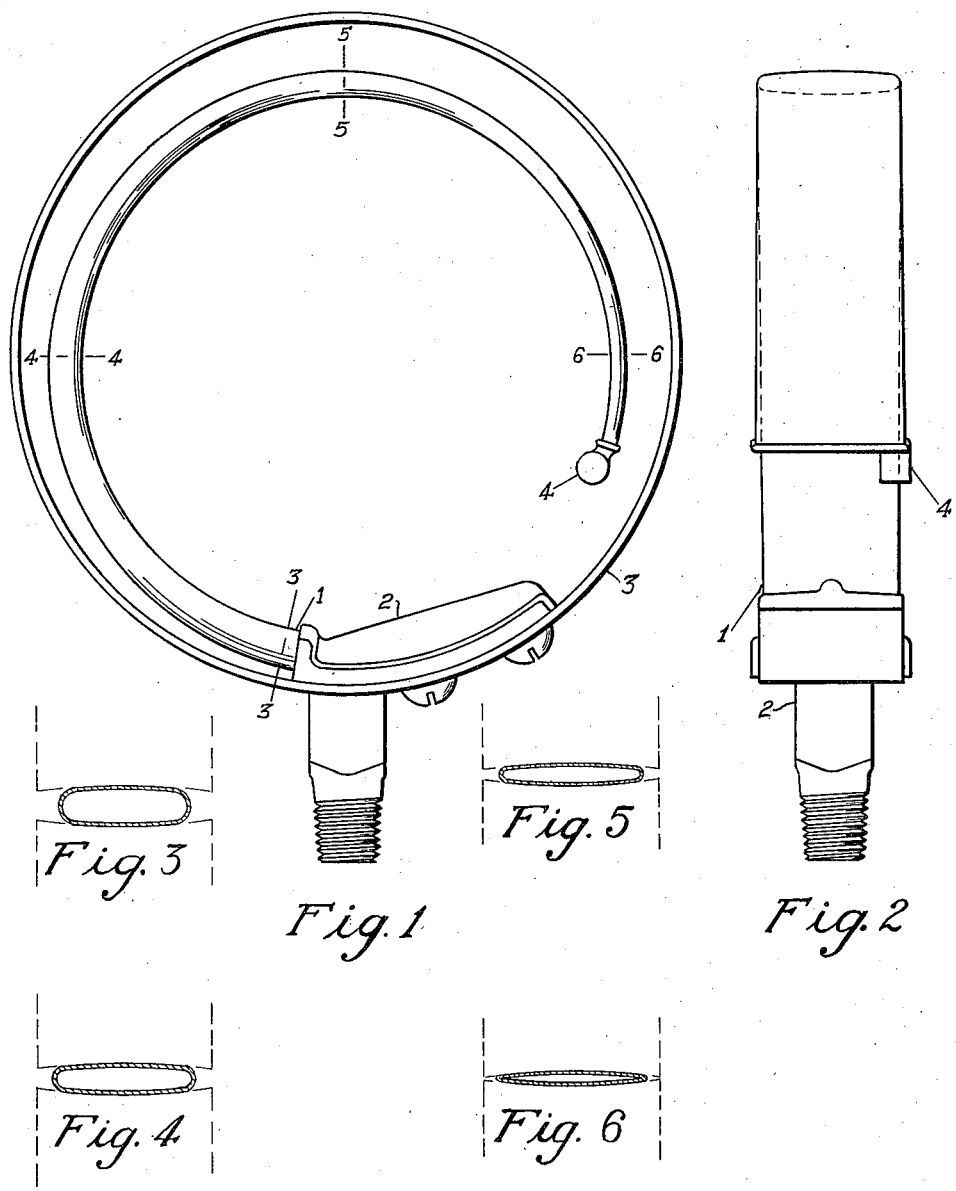

Jan. 6, 1925.

I. E. McCABE

PRESSURE GAUGE TUBE

Filed May 25, 1923

INVENTOR.
Ira E. McCabe
BY
ATTORNEYS.

Patented Jan. 6, 1925.

1,521,638

UNITED STATES PATENT OFFICE.

IRA E. McCABE, OF CHICAGO, ILLINOIS.

PRESSURE-GAUGE TUBE.

Application filed May 25, 1923. Serial No. 641,291.

*To all whom it may concern:*

Be it known that I, IRA E. MCCABE, a citizen of the United States, residing at Chicago, in the county of Cook and State of Illinois, have invented new and useful Improvements in Pressure-Gauge Tubes, of which the following is a specification.

This invention relates to improvements in the construction of gauge tubes such as are formed in a single coil usually employed in pressure gauges and known commercially as Bourdon tubes.

Heretofore these tubes have been oval in cross section, of the same dimensions and thickness of metal throughout. When installed in operative position in the gauge the tube is closed at one end and the other secured in a block fastened to the casing and communicating to the pressure line, source of pressure or atmosphere, as the case may be. Upon increase of pressure upon the interior of the tube the free end uncoils or moves outward and upon decrease of internal pressure the free end contracts or moves toward the center of the coil, and is connected to an indicator hand so that the movement of the free end causes the indicator to travel over a dial. Such tubes are used for other purposes such as connecting the free end to operate an electric switch or other mechanism. In devices of this character it is necessary that the movement of the free end be positive and also very sensitive to changes of pressure.

It is an object of this invention to provide a Bourdon tube which will be stronger adjacent to the block or means of attachment where the greatest strain occurs and extremely sensitive at the free end and yet positive in its movement.

While the preferred forms of this invention are illustrated upon the accompanying sheets of drawing yet it is to be understood that minute detail changes may be made without departing from the scope thereof.

Figure 1 illustrates this improved gauge tube installed in a pressure gauge with the front cover removed and omitting the indicator mechanism attachment at the free end of the tube.

Figure 2 is a view in end elevation of the tube detached.

Figures 7, 8, 9, 10, 11:
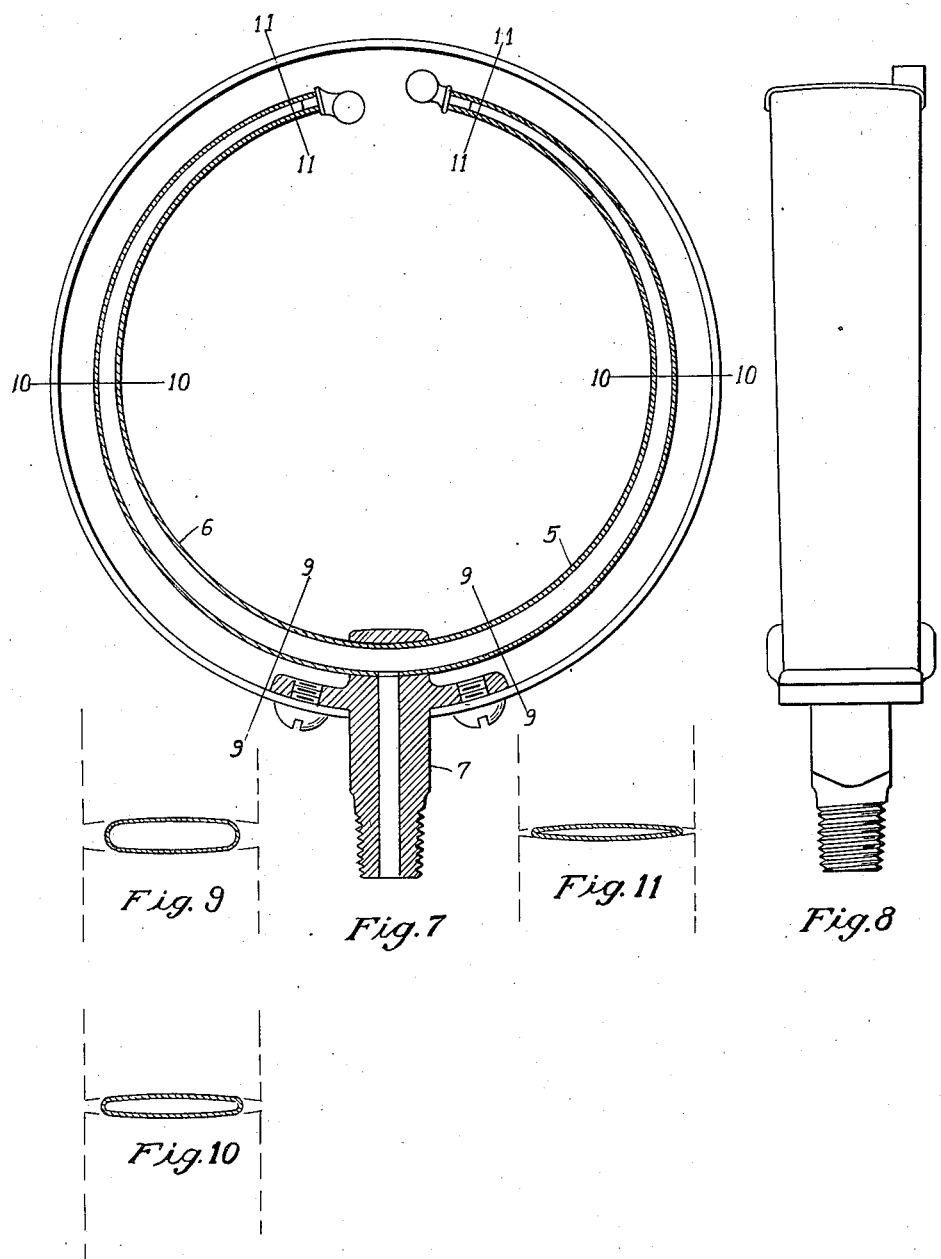

Figures 3, 4, 5, and 6 are views in section taken on the lines 3—3, 4—4, 5—5 and 6—6 respectively on Figure 1.

Figure 7 is a view similar to Figure 1 of a modified form of gauge tube in section.

Figure 8 is a view similar to Figure 2.

Figures 9, 10, and 11 are views in section taken on the lines 9—9, 10—10, and 11—11, respectively, on Figure 7.

In accordance with this invention it is preferable to employ a commercial metal tube of uniform thickness of metal which is either cylindrical or oval in cross section, cut it into sections of proper length and before the curvature is imparted to it, pass each tube between pressure rolls having similar concave pressure surfaces having corresponding radii of curvature. As the tube passes between these rolls the opposite sides in contact therewith are pressed together by causing the axes of the rolls to gradually approach each other by any desired mechanism. This will produce a metal tube of uniform thickness of metal which is flattened from a circular or oval cross section at one end to a flat oval at the other in which the circumference remains constant, the opposite curved sides on approaching each other in flattening of the tube increase in length with the same radii of curvature so that the dimensions of the width of the bore increase while the distance between the curved flattening sides decrease constantly. After the tube has been flattened out in the form described the proper curvature or coil is imparted to it by drawing or any other desired manner.

The cylindrical or normal end 1 is secured to a block or connection 2 which is adapted to be attached to the casing 3 of a gauge or other instrument and provides a means of communication to the interior of the tube from a pressure line, source of pressure or the atmosphere as the case may be. The free end 4 is closed and is adapted to be attached to operate a pressure indicator hand, electric switch or perform the work desired to be accomplished.

A Bourdon tube of constant dimensions throughout its length which is nearly circular or oval in cross section is stronger than one of constant thin or flat oval cross section made from the same kind and thickness of metal, that is, the thick oval tube will do more work at its free end without tendency to set or buckle at its stationary end. However its travel in proportion to the pressure is less and its movement is more apt to be sluggish and less sensitive to pressure changes than the thin oval tube, while on the other hand, the thin oval tube is more apt to take on a permanent set or buckle due to being stressed too much in the operation of the gauge or switch movements especially where the work to be done necessitates the use of lighter thickness of tubing to secure sufficient action.

In this tube by combining the two forms in the manner shown wherein the disadvantages of insufficient travel of the thick oval tube at its free end and insufficient strength of the thin oval tube at its stationary end are eliminated, maximum travel, strength and effects are obtained. This improvement accomplishes results not possible in previous tubes of a similar nature. This improved tube is made from a construction not difficult to procure or produce and already in common use. By this invention the same results as with previous tubes are secured with less material and greater results will be accomplished by the use of the same amount of material, enabling more accurate readings of gauge and finer operating ranges of control on pressure switches.

In pressure gauges and pressure operated devices employing the Bourdon tube it is necessary that the free end be very sensative and at the same time positive in its action. It will be seen that by this invention the structure of the tube is of greatest strength at the fixed end and the sensativeness is constantly increased towards the free end. In removing the tendency to buckle or take on a permanent set from the flattened flexible tube, this improved Bourdon tube combines both strength where needed with flexibility where needed and provides the sensative positive action at the free end that is most desirable. Instruments of this character are also at times subject to shocks or jars that deform the ordinary tube of constant dimensions and it has been found that the tube constructed with this invention is much more durable.

The modification shown on Figure 7 is the application of this invention to another usual form of double Bourdon tube in which the branches 5 and 6 are each secured to a common connection 7 to the pressure line, source of pressure or atmosphere, as the case may be. Each of these branches is constructed in the same manner as the tube shown in Figure 1 and the result is the same, sensative, positive free and movement with greater strength adjacent the fixed ends.

Where the same work is to be performed by this new tube, due to its greater efficiency, it is possible to use greater thickness of metal which increases the safety factor permitting greater stresses due to over pressure without permanent injury or setting of the tube.

What I claim is:

1. A sensitive pressure tube closed at one end adapted to be placed in connection with a source of pressure at the other end, said tube having a metal wall of uniform thickness and circumference throughout its length and flattened progressively towards its closed end.

2. A curved sensitive pressure tube spring having a metal wall of constant circumference throughout its length, closed at one end and increasingly flattened towards the closed end.

3. A curved sensitive pressure tube spring having a metal wall of uniform circumference, closed at one end and increasingly flattened towards the closed end, the increasingly flattened surfaces on opposite sides of the wall of the tube approaching each other on curves of constant radii.

IRA E. McCABE.